United States Patent [19]

Joyner

[11] Patent Number: 4,574,901

[45] Date of Patent: Mar. 11, 1986

[54] WHEELCHAIR SEAT

[76] Inventor: Albert W. Joyner, 3390 Fox Lake Rd., Titusville, Fla. 32780

[21] Appl. No.: 715,886

[22] Filed: Mar. 25, 1985

[51] Int. Cl.$^4$ .................... B60K 1/00

[52] U.S. Cl. .................... 180/65.1; 180/907; 280/289 WC; 297/311; 297/337

[58] Field of Search .................... 280/242 WC, 289 WC; 180/907, 65.1; 297/311, 312, 337, DIG. 3; 5/90; 296/65 R; 128/33

[56] References Cited

U.S. PATENT DOCUMENTS

| | | | |
|---|---|---|---|
| 3,062,582 | 11/1962 | Baldwin | 297/118 |
| 3,719,390 | 3/1973 | Haney | 297/6 |
| 3,964,786 | 6/1976 | Mashuda | 280/242 WC |
| 4,334,709 | 6/1982 | Akiyama et al. | 297/312 |

*Primary Examiner*—David M. Mitchell
*Assistant Examiner*—Richard M. Camby
*Attorney, Agent, or Firm*—Duckworth, Allen, Dyer & Pettis

[57] ABSTRACT

An improved seat for a wheelchair having a forward section for supporting the occupant's thigh areas and a rearward section hingedly attached to the forward section for supporting the occupant's buttocks area. The rearward section is attached to a linear actuator which moves the rearward section downward such that the occupant is aupported by the forward section of the seat and the back rest of the wheelchair, thus permitting air circulation around the buttocks area and blood circulation in the buttocks region to prevent breakdown of skin and flesh in the buttocks area. An automatic control is provided to periodically lower and raise the rearward seat section without attention of the occupant.

14 Claims, 7 Drawing Figures

WHEELCHAIR SEAT

BACKGROUND OF THE INVENTION

1. Field of the Invention

The present invention relates to the construction of chair seats for disabled persons, and more particularly, to a seat design which will prevent problems due to loss of blood circulation in the hip and buttocks area of such persons.

2. Description of the Prior Art

Many disabled persons have no feeling in the lower parts of their bodies due to injuries to the spinal cord or similar problems. Such persons generally utilize wheelchairs during their waking hours to be able to have some mobility. However, a serious problem in many instances results from the lack of blood circulation and air to the lower parts of the body and in particular to the buttocks area. Since the person will sit relatively immobile for many hours, he or she is particularly susceptible to this problem. When this happens the flesh and skin breaks down producing decubiti, commonly referred to as bed sores.

Due to the unfortunate loss of feeling, the person has no immediate indication of the development of such sores which may progress to a serious condition before discovery. The basic problem appears to be restriction of blood circulation due to the torso weight over the hip joint in contact with the seat of the wheelchair or other chair in which the person may spend extensive periods of time. This situation may be aggravated by poor air circulation to the skin. Previous attempts to alleviate this problem include the use of various types of cushions and the like and continuous attention on the part of other persons.

I have found that a special seat for a wheelchair or other invalid chair will prevent this problem. The seat involves a portion which will fold downward just below the buttocks such that the occupant is supported by the thighs and back. While there have been wheelchairs in the past in which the seat may be dropped, such as U.S. Pat. Nos. 3,051,368 and 3,062,582, these mechanisms are for the purpose of permitting the occupant of the wheelchair to have access to a toilet bowl and therefore no support is provided when the seat is displaced. A typical example is U.S. Pat. No. 3,719,390 in which a pivoted seat simply swings completely clear of the seat area of the chair. The occupant must use lifting bars in order to pivot the seat. An articulated seat is taught in U.S. Pat. No. 3,964,786 for the purpose of permitting the occupant to assume any one of three positions, namely sitting, standing or reclining.

SUMMARY OF THE INVENTION

The present invention utilizes an articulated seat for a wheelchair, or other type of chair for disabled persons, and having two sections. A first section is dimensioned to extend from the knee joint to the thigh of a person using the seat. A second narrow portion extends rearwardly to the back of the chair and supports the buttocks. The second section is hinged, for example, to the rear edge of the front section and connected to a power actuator; and in a wheelchair utilizing a battery operated power system for moving the chair, an electrical liner actuator is preferred. However, it is to be understood that any suitable motive device is satisfactory. The actuator is mounted underneath the rear portion of the seat and connected to the chair frame. The actuator rod connects to the rear of the rear seat section such that in the fully extended position, the rear section is level and contiguous with the front seat section. Upon applying power to the actuator, the actuator rod is withdrawn causing the rear portion of the seat to fold downward. As will be understood, this removes any contact of the occupant's buttocks with the seat and the occupant is entirely supported in the chair by the thighs and the contact of the person's back with the chair seat back.

In this position, air can circulate around the buttocks area of the occupant and the pressure between the seat and the hip bone is relieved allowing full blood circulation to take place.

The actuator may be controlled by a switch attached to the arm rest of the chair along with suitable pilot lights to remind the occupant whether the movable portion of the seat is up or down. Preferably, however, a time device is provided which will operate the seat automatically on a reqularly programmed periodic basis. Thus, the occupant need take no action and the seat will drop automatically at the predetermined intervals. I have found that using alternating periods of about fifteen minutes of support and about five minutes without the rear support is satisfactory.

It is therefore a principal object of my invention to provide an improved seat for disabled persons having a back or rearward portion of the seat which can be dropped to provide air circulation to the lower parts of the person's body and to permit blood circulation to thereby prevent formation of bed sores.

It is another object of the invention to provide a seat for a wheelchair or the like for disabled persons having a rear portion of the seat which may be moved downward automatically at predetermined intervals.

It is yet another object of my invention to provide a manual override of the eletrical portion of the raise and lowering of the rear portion of the seat and/or with a separate power source from that of the chair.

It is yet another object of my invention to provide a wheelchair seat in which the rear portion may be dropped (or raised) by manual control (in the form of a lever or other manual means) in which the person is then supported by the thighs in contact with a front portion of the seat and the back in contact with the back rest of the chair.

These and other objects and advantages of my invention will become apparent from the following detailed description when read in conjunction with the drawings.

DETAILED DESCRIPTION OF THE PREFERRED EMBODIMENT

Figure 1:
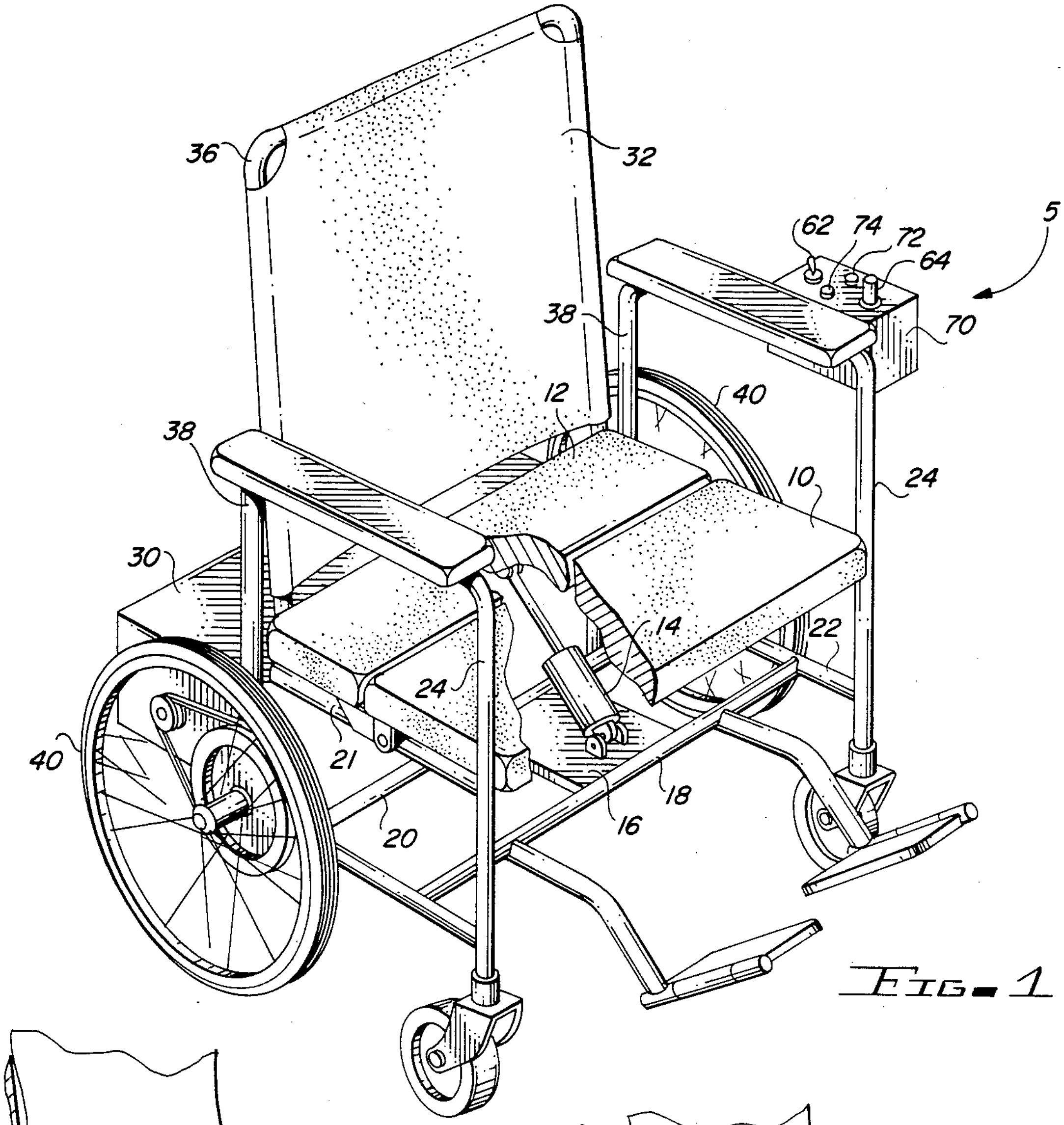
FIG. 1 is a perspective view of a typical self powered wheelchair having the seat of the invention installed therein, with portions of the wheelchair cut away to illustrate the actuating mechanism thereof.
Figure 4:
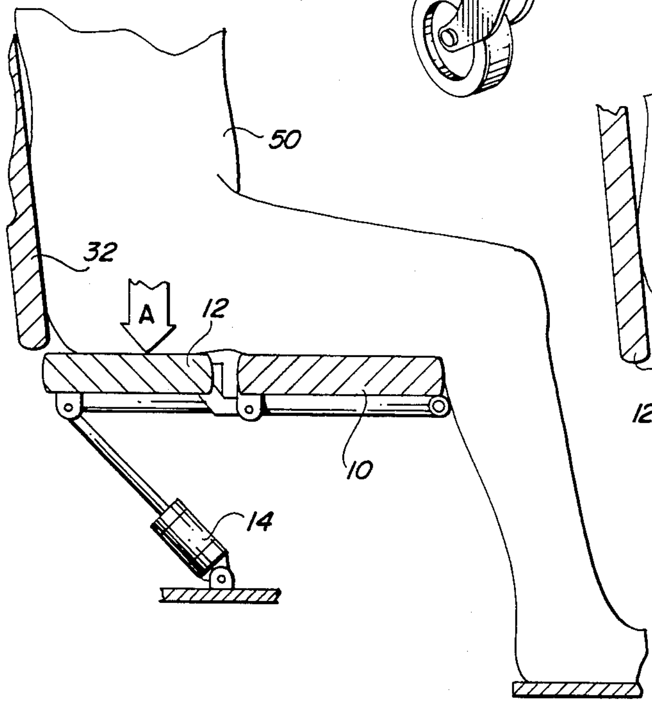
FIG. 4 is a schematic view of a cross section of the wheelchair seat and back rest occupied by a person with the rear portion of the seat in the up position.
Figure 5:
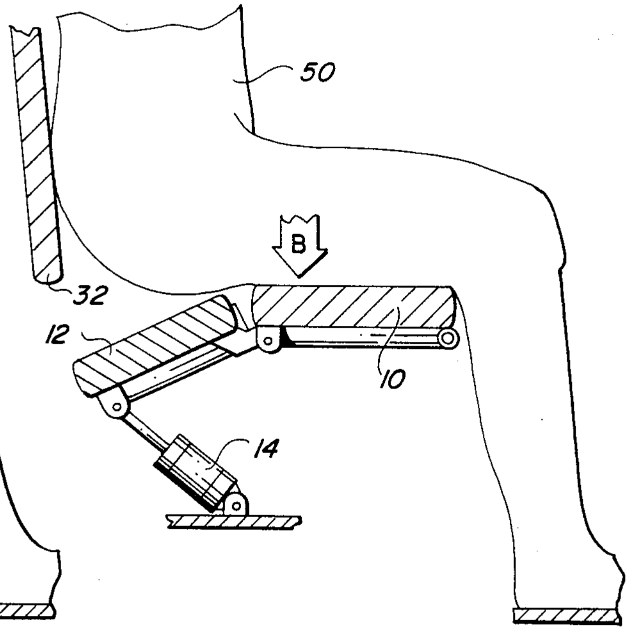
FIG. 5 is the schematic diagram of FIG. 4 showing the rear portion of the seat in the down position.

Referring to FIG. 1, a typical self powered wheelchiar 5 is shown in perspective view. Although not part of the present invention, a power unit 30 is provided containing storage batteries such as a 12 or 24 volt battery which drives a motor coupled to wheels 40 utilizing controls (not shown). The wheelchair includes a back portion 32 supported by frame 36 and various tubular framework elements to be described below. The seat is supported on tubular elements 21 and comprises a forward section 10 and a rearward section 12. Although not seen in FIG. 1, rearward section 12 is hinged to the rear edge of forward section 10, although the section 12 may also be hinged at other positions. Rearward section 12 is shown in what will be referred to as the up position in FIG. 1 and is maintained in that position by a linear actuator 14. The upper end of actuator rod 15 is connected to the rear edge of rearward seat section 12 and the lower end of actuator 15 is pivoted to plate 16 attached to frame elements 18 and 20. These elements are supported by longitudinal frame elements 22.

Figure 2:
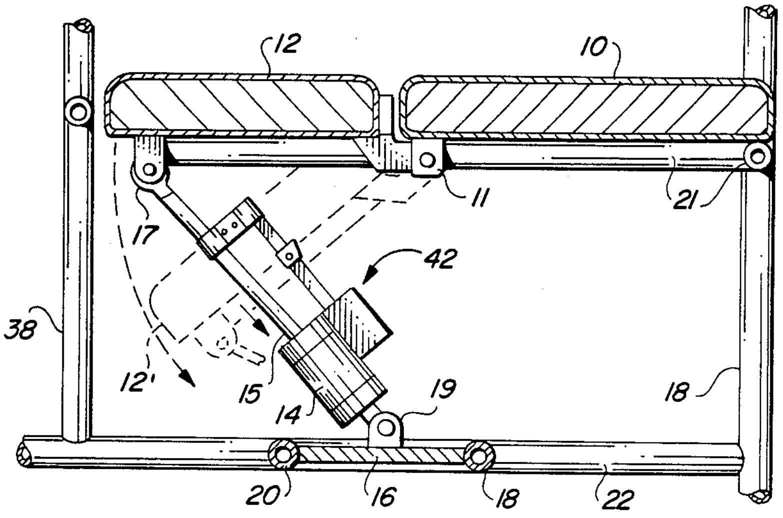
FIG. 2 is a cross-sectional view through the wheelchair seat and framework of the wheelchair of FIG. 1 showing details of the mounting of the actuator connected to the rear portion of the seat.

Additional details of the actuator 14 and the mounting thereof are shown in FIG. 2. As may be noted, rearward seat section 12 is pivoted to forward seat section 10 by pivot 11. Actuator rod 15 is connected by clevis 17 to the rear of rearward seat section 12. Similarly, the lower end of actuator 14 is connected to clevis 19 mounted on plate 16. Seat support tubes 21 are connected to front vertical support tubes 18 and rear vertical support tubes 38. Each of such tubes connect to longitudinal tubes 22.

Also shown in phantom view in FIG. 2 is the lower position of rearward seat section 12 which has been folded downward as actuator rod 15 moves in the direction shown by the arrow. A limit switch assembly 42 is attached to actuator rod 15 and linear actuator 14 to define the up position and down position of rear seat section 12.

Figure 3:
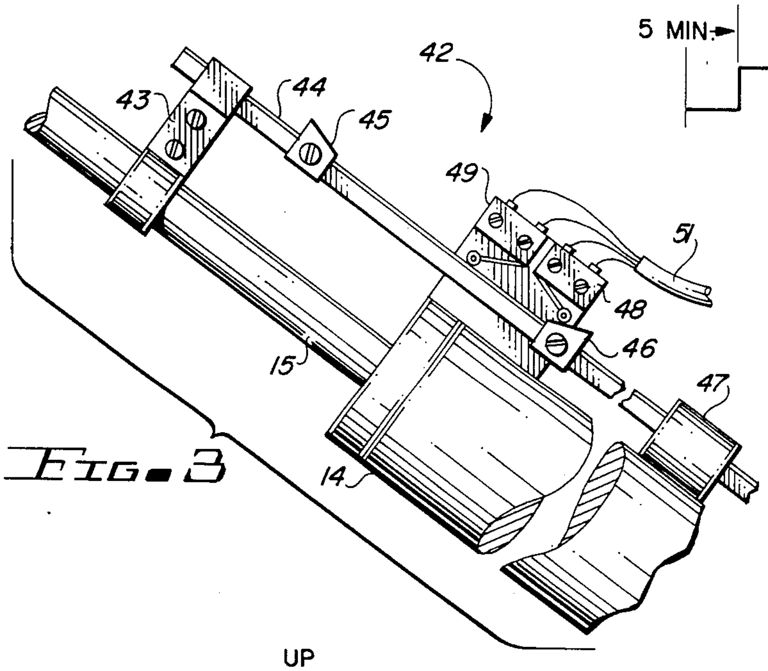
FIG. 3 is a partial view of the actuator of FIG. 2 showing the arrangement of limit switches which for controlling the length of the actuator stroke.

Additional details of limit switch assembly 42 are shown in FIG. 3. A rod 44 is coupled to actuator rod 15 by clamp 43 which is adjustable to permit setting of the limit points. The opposite end of rod 44 rides in bearing assembly 47. A pair of cams 45 and 46 are adjustably disosed on rod 44. Limit switches 48 and 49 are suitably mounted on a bracket to actuator body 14 and have electrical wiring cable 51 attached thereto. In the illustration of FIG. 3, actuator rod 15 is fully extended and up cam 46 has operated limit switch 48. As will be understood, when actuator 15 is retracted, down cam 45 will contact down limit switch 49 which will serve to stop actuator 14.

A control box for the system may be mounted to an arm rest 75 of wheelchair 5 is shown in FIG. 1. It is desirable to have an auto-manual switch 62 to permit the occupant or an attendant to select either manual or automatic operation of the movable seat portion. When in the manual position of switch 62, control is effected by manual switch 64. A pilot light 72 will indicate when switch 62 is in the manual position to alert the occupant of the chair that there is no buttocks support being provided. When switch 62 is moved to the automatic position, the pilot light 74 will be illuminated indicating to the occupant that automatic operation is occuring.

Figure 6:
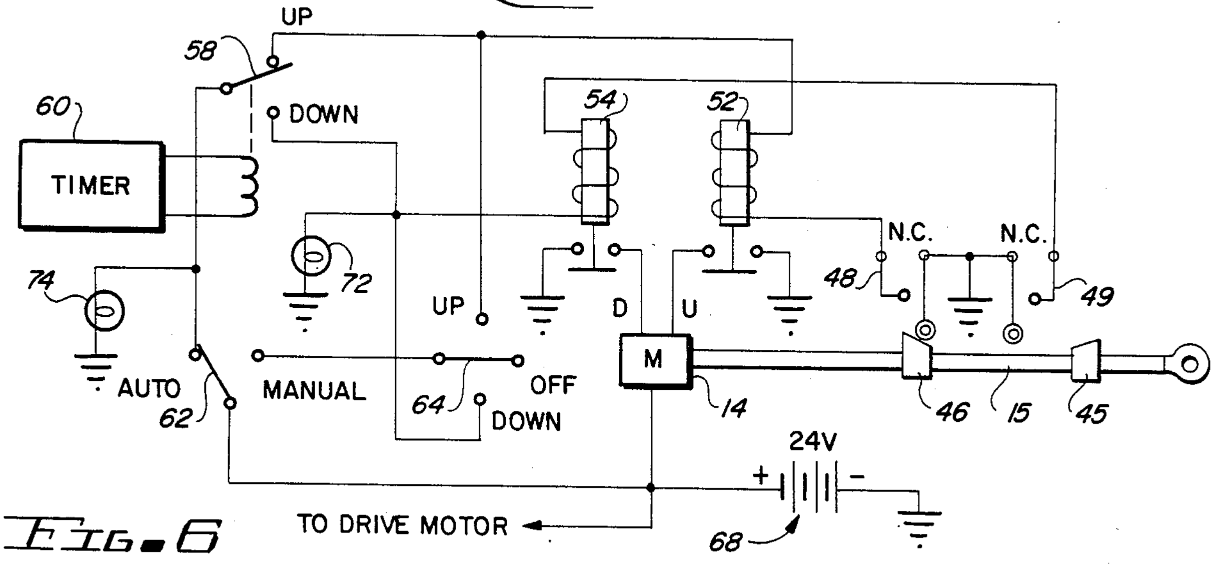
FIG. 6 is a schematic diagram of the control circuits for the wheelchair of FIG. 1.

Turning now to FIG. 6, a simplified schematic diagram of the electrical and control circuits of the invention is shown. In the implementation of my invention disclosed herein, actuator 14 includes an electrical motor which drives actuator shaft 15 through a suitable gear train. Actuator motor 14 will have an up winding and a down winding indicated by the letters D and U in FIG. 6. The common motor lead connects directly to the 12 or 14 volt battery 68 through suitable fuses or breakers not shown but well known to those of skill in the art. A solenoid contactor 54 is used to energize the down movement of actuator 14 and up solenoid contactor 52 energizes the up winding of actuator 14. Contactor 54 is connected to the negative or ground terminal of battery 68 via the normally closed contacts of down limit switch 49. Similarly, up contactor 52 connects to ground via the normally closed conacts of up limit switch 48, which in the figure are shown open as it is assumed that the schematic shows the system in the up position. The battery voltage is applied to the respective contactors 52 and 54 as desired neither through relay 58 or through switch 64. When switch 62 is in its manual position, battery is applied to contactors 52 or 54 depending upon the position of switch 64 which is a single pole, double throw switch having an off center position. In the FIG. 6, switch 64 is in the off position since the manual switch is not in use.

Switch 62 is shown thrown to the automatic position which connects the battery to relay 58 and to timer 60. When relay 58 is non-operated as in the drawing, battery is connected to contactor 52 via the normally closed back contacts of relay 58 as indicated in the figure. This, of course, causes actuator 14 to extend raising the seat to the up position. Relay 58 is controlled by a timer 60, which may be any well known timing device such as an electrically driven mechanical timer, or a digital timing device. When the timer 60 energizes the coil of relay 58, the normally open contacts of that relay will close energizing down contactor 54 causing actuatory rod 15 to retract. This action will continue until limit can 45 opens down limit switch 49. When the timer releases relay 58, the up contactor 52 will be energized causing the seat to be raised to the up position.

Figure 7:
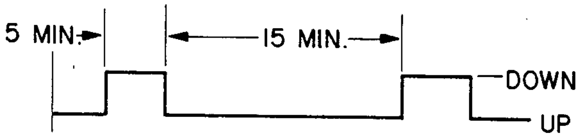
FIG. 7 is a timing diagram for the typical control of the type shown in FIG. 6.

FIG. 7 shows a typical timing diagram for automatic timer 60. As will be noted, relay 58 will be energized for about 5 minutes and de-energized for about 15 minutes with this cycle being repeated as long as the timer is on. To alert the occupant that the system is under automatic control, pilot light 74 is connected to the automatic line such that it will be illuminated when switch 62 is thrown to AUTO. When 62 is in the manual position, it is desirable that the occupant recognize whether the seat is in the up or down position and therefore, a pilot light 72 is connected to the down lead and will be illuminated whenever switch 64 is moved to the down position.

Although I have described my invention with respect to the specific embodiments shown in the drawings, I consider that many variations may be made without departing from the spirit or scope of the invention. For example, although I disclosed my invention in conjunction with a wheelchair, there are many other types of seating devices disabled persons to which my improved seat would be eminently aplicable. While I have disclosed an electrical actuator, it is clear that a hydraulic pneumatic actuator, or a lever and cam action can be used. A manually operated system is also suitable. Therefore, I am not to be limited to these exemplary embodiments.

I claim:

1. A seat for invalid chair comprising:

a framework;

a forward section of said seat attached to said framework for supporting the thighs of an occupant of said chair;

a rearward section of said seat for supporting the buttocks area of the occupant thereof;

actuating means attached to said rearward seat section for selectively moving said rearward seat portion from an up position in which the occupant is supported by said forward seat section and said rearward seat section to a down position in which said occupant is not supported by said rearward seat section, thereby permitting air flow to the buttocks area of the occupant and unrestricted blood flow through such buttocks area.

2. The seat as defined in claim 1 further comprising a back rest attached to said framework, said occupant further supported by said back rest when said rearward section is in said down position.

3. The seat as defined in claim 1 in which:

said rearward seat section is hingedly attached to said forward-seat section; and said actuating means includes a linear actuator having an actuating rod pivotally attached to said rearward seat section; and control system means for controlling said actuating means.

4. The seat as defined in claim 3 in wich said linear actuator includes:

an electrical actuating motor;

an up limit switch for stopping said actuator in said up position; and a down limit switch for stopping said actuator in said down position.

5. The seat as defined in claim 4 in which said control system means includes a manually operated switch for energizing either an up movement or a down movement of said linear actuator.

6. The seat as defined in claim 5 in which said control system means includes a relay for energizing either an up movement or a down movement of said linear actuator; and timing means operatively connected to said relay for alternately controlling said relay to cause an up movement and a down movement of said linear actuator, said rearward seat section remaining alternately in an up position and a down position for respective preselected periods thereof.

7. The seat as defined in claim 6 in which the period of said down position is shorter than the period of said up position.

8. The seat as defined in claim 6 in which said timing means includes an electrically driven mechanical timer.

9. The seat as defined in claim 6 in which said timing means includes an electronic timer.

10. The seat as defined in claim 1 in which said invalid chair is a wheelchair.

11. The seat as defined in claim 1 in which said invalid chair is a self powered wheelchair having a battery.

12. The seat recited in claim 1 further comprising timing means operatively coupled to said actuating means to cause said rearward section to sequentially move to said up position and then said down position for preselected time intervals.

13. In a self powered wheel chair having a battery, an improved seat for preventing breakdown of skin and flesh in the buttocks area of an occupant thereof comprising:

an articulated seat having a forward section suitable for contacting and supporting the thigh areas of the occupant and a rearward section for contacting and supporting the buttocks area of the occupant;

an actuator disposed beneath said seat and attached to said wheelchair for moving and maintaining said rearward section in either an up position in contact with the buttocks of the occupant or in a down position out of contact with the buttocks of the occupant; and automatic control means connected to said battery and to said actuator for controlling said actuator to alternately move said rearward section to said up position for a first preselected period of time and to said down position for a second preselected period of time.

14. The wheelchair recited in claim 13 further comprising:

said rearward section hingedly attached to said forward section; and an actuator rod attached to the rear edge of said rearward section of said seat.

* * * * *